(12) United States Patent
Harrison et al.

(10) Patent No.: US 11,685,352 B2
(45) Date of Patent: Jun. 27, 2023

(54) VEHICLE BRAKING SYSTEM

(71) Applicant: Haldex Brake Products Aktiebolag, Landskrona (SE)

(72) Inventors: Dudley John Harrison, West Midlands (GB); Carl Mellings, West Midlands (GB); Mark Pieczko, Warwickshire (GB); Neil Brightman, Warwickshire (GB)

(73) Assignee: Haldex Brake Products AB, Landskrona (SE)

( * ) Notice: Subject to any disclaimer, the term of this patent is extended or adjusted under 35 U.S.C. 154(b) by 586 days.

(21) Appl. No.: 16/315,845

(22) PCT Filed: Jul. 4, 2017

(86) PCT No.: PCT/GB2017/051967
§ 371 (c)(1),
(2) Date: Jan. 7, 2019

(87) PCT Pub. No.: WO2018/007799
PCT Pub. Date: Jan. 11, 2018

(65) Prior Publication Data
US 2021/0276522 A1    Sep. 9, 2021

(30) Foreign Application Priority Data

Jul. 5, 2016 (GB) ...................................... 1611713

(51) Int. Cl.
*B60T 13/38* (2006.01)
*B60T 13/68* (2006.01)
(Continued)

(52) U.S. Cl.
CPC .......... *B60T 13/263* (2013.01); *B60T 13/265* (2013.01); *B60T 13/385* (2013.01); *B60T 7/203* (2013.01); *B60T 13/683* (2013.01); *B60T 15/226* (2013.01)

(58) Field of Classification Search
CPC ........ B60T 7/20; B60T 13/263; B60T 13/265; B60T 13/385; B60T 13/683;
(Continued)

(56) References Cited

U.S. PATENT DOCUMENTS 4,480,663 A * 11/1984 Bergemann ............. B60T 15/18
137/627.5
6,338,534 B1    1/2002 Kee et al.
(Continued)

FOREIGN PATENT DOCUMENTS

AU       2012200062 A1    2/2012
DE    102007051151 A1 *  11/2008    .............. B60T 15/18
(Continued)

OTHER PUBLICATIONS

International Search Report and Written Opinion, PCT/GB2017/051967, dated Oct. 16, 2017.

*Primary Examiner* — Thomas J Williams
(74) *Attorney, Agent, or Firm* — Stoel Rives LLP

(57) ABSTRACT

A vehicle braking system comprising a spring brake actuator having a spring brake chamber, a spring brake control assembly and an immobiliser valve which is movable between brake release position in which the spring brake control assembly is operable to cause the flow of pressurised fluid into the spring brake chamber or to vent the spring brake chamber to a low pressure region, and an immobilise position in which the spring brake control assembly is operable to connect the spring brake chamber to a low
(Continued)

Figure 1:
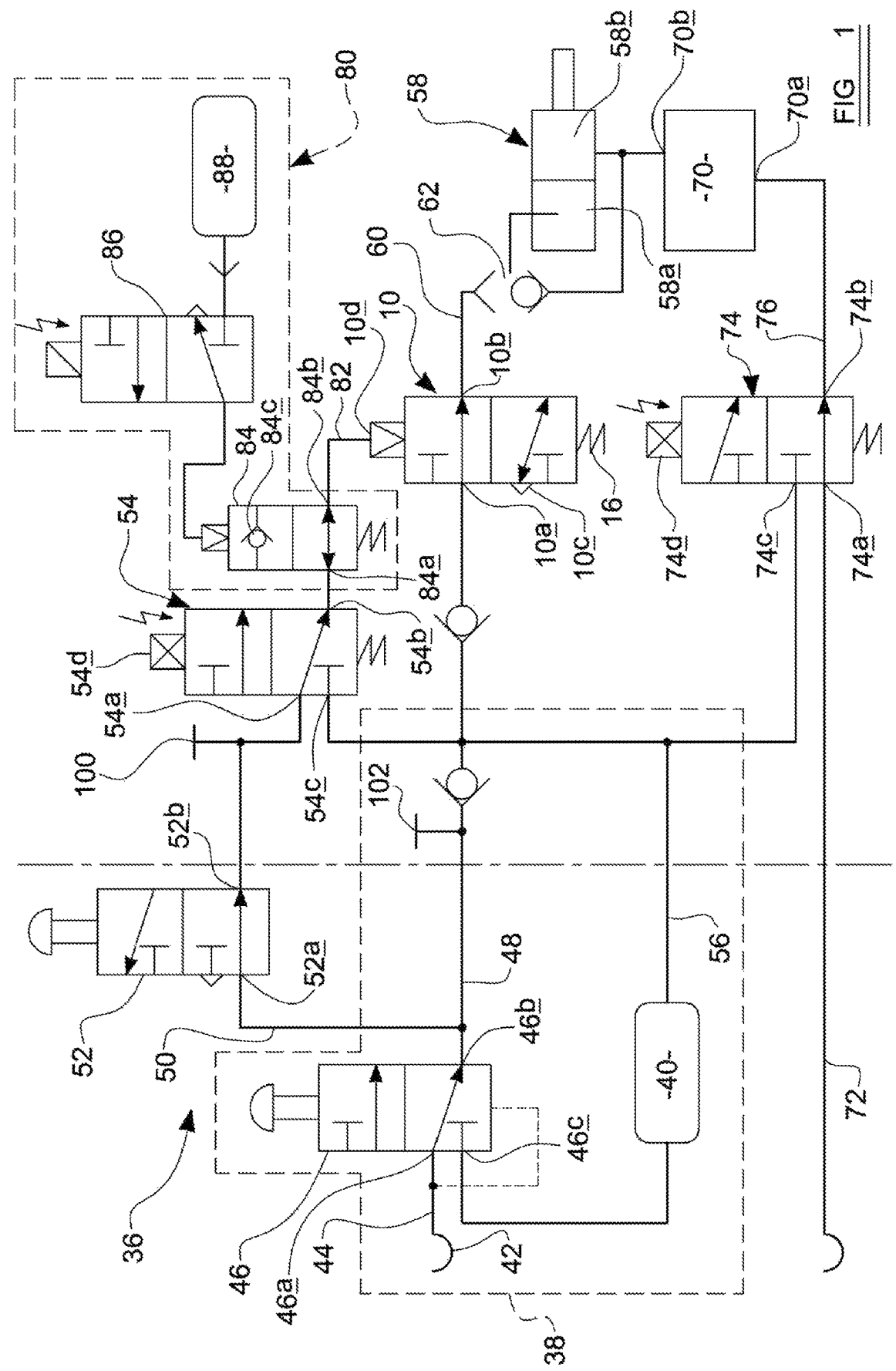

pressure region but cannot be operated to cause the flow of pressurised fluid into the spring brake chamber.

30 Claims, 6 Drawing Sheets

(51) Int. Cl.
 *B60T 7/20* (2006.01)
 *B60T 13/26* (2006.01)
 *B60T 15/22* (2006.01)
(58) Field of Classification Search
 CPC ...... B60T 15/027; B60T 15/181; B60T 15/54; B60T 15/226; B60T 7/203; B60R 25/08
 USPC .................................................. 303/89, 123
 See application file for complete search history.

(56) References Cited

U.S. PATENT DOCUMENTS

| | | | |
|---|---|---|---|
| 6,392,516 B1 | 5/2002 | Ward et al. | |
| 2001/0050509 A1 | 12/2001 | Holt | |
| 2005/0062344 A1 | 3/2005 | Holt et al. | |
| 2010/0025141 A1* | 2/2010 | Bensch | B60T 13/683 180/271 |
| 2010/0026084 A1 | 2/2010 | Risse | |
| 2014/0021778 A1* | 1/2014 | Bryar | B60T 13/385 303/84.2 |
| 2021/0276522 A1* | 9/2021 | Harrison | B60T 15/246 |

FOREIGN PATENT DOCUMENTS

| | | | | |
|---|---|---|---|---|
| DE | 102008027733 A1 | * | 12/2009 | ............ B60T 13/683 |
| DE | 102008027733 B4 | * | 7/2012 | ............ B60T 13/683 |
| EP | 0739798 A2 | * | 10/1996 | ............ B60T 17/18 |
| EP | 2928734 A1 | | 10/2015 | |
| GB | 2492124 A | * | 12/2012 | ............ B60T 13/686 |
| GB | 2546254 A | * | 7/2017 | ............ B60T 17/18 |
| WO | 9429155 A1 | | 12/1994 | |
| WO | 01/94130 A1 | | 12/2001 | |
| WO | 03106232 A1 | | 12/2003 | |
| WO | 2005/115810 A2 | | 12/2005 | |
| WO | 2005115811 A1 | | 12/2005 | |
| WO | 2008031479 A1 | | 3/2008 | |
| WO | 2009/046512 A2 | | 4/2009 | |
| WO | 2012097400 A1 | | 7/2012 | |
| WO | 2012/175927 A1 | | 12/2012 | |
| WO | WO-2015176916 A1 | * | 11/2015 | ............ B60T 17/083 |

* cited by examiner

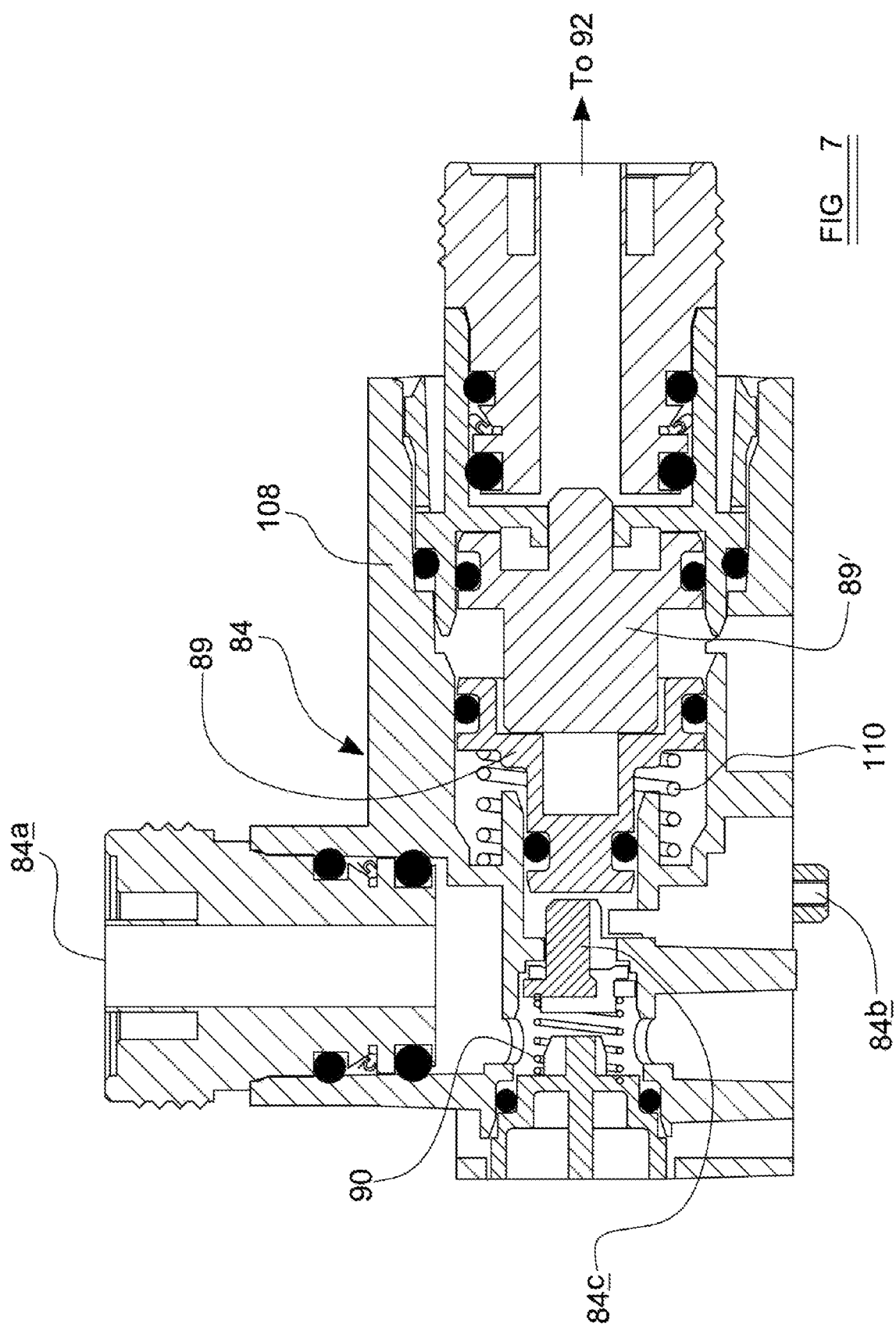

VEHICLE BRAKING SYSTEM

DESCRIPTION OF INVENTION

The present invention relates to a vehicle braking system, in particular for a trailer vehicle.

Trailer vehicle are typically provided with a service braking system by means of which a braking force is applied to the trailer wheels as a result of the supply of pressurised fluid (generally compressed air) to a plurality of brake actuators, and a parking brake or spring brake system. The spring brake actuators are configured such that the supply of pressurised fluid (again, typically compressed air) maintains the spring brake in a release position, in which no braking force is applied to the trailer wheels, whilst release of pressurised fluid from the spring brake actuators causes these to move, under the action of a spring, to apply a braking force.

It is known to provide trailers with a security system for immobilising the trailer to prevent attempted theft of the trailer. Examples of such security systems are disclosed in WO2009/046512, WO2005/115810, US2005/0062344, WO 01/94130, EP2928734 and EP2066536.

In the systems disclosed in US 2005/0062344 and WO 01/94130, the trailer is provided with a locking device which acts to prevent unauthorised movement or theft of the trailer by venting the compressed air that is used to release the parking brake. The locking device has a controller unit, a control valve and a power source mounted inside a housing. A control mechanism, such as a key pad or key lock system is located outside of the housing, preferably on a trailer wall. The inlet of the control valve connects to the brake line that delivers compressed air to the trailer's parking brakes. In the locked condition, the control valve is set so compressed air vents out of the control valve's outlet, preventing the release of the brakes. When the proper lock key code, key or other signal is received, the control valve closes the outlet to stop the venting and allow the brakes to be released.

In the systems described in EP2928734 and EP2066536, the braking system includes a bistable electromagnetically switchable current surge valve which is located in a connecting line between a manually operable parking valve and an overload protection valve via which fluid pressure is supplied to the brake actuators. The bistable valve is controlled by two solenoids, supply of electrical power to one causing the valve to connect the parking valve to the overload protection valve, and the supply of electrical power to the other causing the valve to vent the overload protection valve to atmosphere, thus causing the application of the spring brake.

The present invention relates to an alternative configuration of the vehicle immobiliser system.

According to a first aspect of the invention we provide a vehicle braking system comprising a spring brake actuator having a spring brake chamber, a spring brake control assembly and an immobiliser valve which is movable between a brake release position in which the spring brake control assembly is operable to cause the flow of pressurised fluid into the spring brake chamber or to vent the spring brake chamber to a low pressure region, and an immobilise position in which the spring brake control assembly is operable to move to connect the spring brake chamber to a low pressure region but cannot be operated to cause the flow of pressurised fluid into the spring brake chamber.

The immobiliser valve preferably has an inlet and an outlet and a check valve, and is configured such that when the immobiliser valve is in its brake release position the inlet is connected directly to the outlet so that flow of fluid from the inlet to the outlet and vice versa is permitted, and when the immobiliser valve is in its immobilise position the inlet is connected to the outlet via the check valve such that flow of fluid from outlet to the inlet is permitted but the check valve acts to prevent flow of fluid from the inlet to the outlet.

The immobiliser valve may be an electrically operated bi-stable valve, so that when in its brake release position, on receipt of an electrical signal, it moves to its immobilise position, and remains in the immobilise position once the electrical signal ceases, and when in its immobilise position, on receipt of electrical signal, it moves to the brake release position and remains in the brake release position once the electrical signal ceases.

The spring brake control assembly may include a spring brake control valve having an inlet which is adapted to be connected to a source of pressurised fluid, an outlet which is connected to the spring brake chamber via a spring brake line, and an exhaust port which is connected to a low pressure region, the spring brake control valve being movable between a first position in which the inlet of the spring brake control valve is connected to its outlet whilst the exhaust port is closed, and a second position in which the outlet of the spring brake control valve is connected to the exhaust port whilst the inlet is closed.

The immobiliser valve may be located in the spring brake line, and arranged such that when it is in its immobilise position, the immobiliser valve permits flow of fluid from spring brake chamber to the outlet of the spring brake control valve whilst substantially preventing flow of fluid from the outlet spring brake control valve into the spring brake chamber.

The spring brake control valve may have a control port, supply of pressurised fluid to the control port causing the spring brake control valve to move to its first position.

The spring brake control valve may have a resilient biasing element which acts to urge the spring brake control valve into the second position. In this case, the spring brake control valve may have a control port and be configured such that when the fluid pressure at the control port exceeds a pre-determined level, the spring brake control valve moves against the biasing force of the resilient biasing element from the second position to the first position.

The immobiliser valve may be located in a park line which extends from a source of pressurised fluid to the control port of the spring brake control valve, the immobiliser valve, when in its brake release position, allowing flow of fluid in a first direction along the park line away from the control port, and along the park line in a second direction towards the control port, and when in its immobilised position allowing the flow of fluid in the first direction along the park line but substantially preventing the flow of fluid in the second direction along the park line.

The system may include an electrically operable emergency braking override valve which is electrically operable to cause the flow of pressurised fluid to the spring brake chamber even if the immobiliser is in its immobilise position.

The system may include an electrically operable emergency braking override valve which is located in the park line and which has a first inlet which is connected to a portion of the park line which extends towards the source of pressurised fluid, a second inlet which is connected to a pressurised fluid reservoir, and outlet which is connected to a portion of the park line which extends to the control port of the spring brake control valve, the emergency braking override valve being movable between a first position in which its first inlet is connected to its outlet and a second position in which its second inlet is connected to its outlet.

The immobiliser valve may be located in the park line between the outlet of the emergency braking override valve and the control port of the spring brake control valve. Alternatively, the emergency braking override valve may be located in the park line between the immobiliser valve and the control port of the spring brake control valve.

The immobiliser valve may be configured to move automatically from the brake release position to the immobilise position when the spring brake chamber is connected to a low pressure region.

The immobiliser valve may include a fluid pressure operated actuator and a resilient biasing element which urges the immobiliser valve to its immobilise position, the fluid pressure operated actuator being configured such that the supply of pressurised fluid to the actuator moves the immobiliser valve against the force of the resilient biasing element into its brake release position. In this case, the fluid pressure operated actuator of the immobiliser valve may be connected to the control port of the spring brake control valve. In this case, means may be provided to connect the fluid pressure operated actuator of the immobiliser valve to an alternative source of pressurised fluid. Alternatively, the immobiliser valve may be provided with a further fluid pressure operated actuator which is configured such that the supply of pressurised fluid to the actuator moves the immobiliser valve against the force of the resilient biasing element into its brake release position, and which is connected to the alternative source of pressurised fluid.

The spring brake control assembly may further include a park valve which is manually movable to a position which causes the spring brake control assembly to connect the spring brake chamber to a low pressure region. The park valve may be located in the park line and may be movable between a first position in which it does not impede flow of fluid along the park line, and a second position in which it connects the portion of the park line extending towards the control port of the spring brake control valve to a low pressure region.

The emergency braking override valve may be located in the park line between the control port of the spring brake control valve and the park valve.

The immobiliser valve may be located in the park line between the park valve and the emergency braking override valve.

The spring brake control assembly may further comprise a source of pressurised fluid which is connected to the inlet of the spring brake control valve. In this case, the source of pressurised fluid may comprise a pressurised fluid reservoir. Additionally or alternatively, the source of pressurised fluid may comprise a connector which is adapted to be connected to an external source of pressurised fluid. The vehicle may comprise a trailer, and the source of pressurised fluid may comprise a connector which is adapted, in use, to be connected to a pressurised fluid supply mounted on a tractor. In this case, where the spring brake control valve comprises a control port, the control port may also be connected to the connector via the park line.

The spring brake actuator is preferably configured to apply a braking force to a wheel of the vehicle when the pressure in the spring brake chamber falls below a predetermined level, and to release the/not apply a braking force to the wheel of the vehicle when the pressure in the spring brake chamber is at or above the predetermined level, the outlet of the spring brake control valve being connected to the spring brake chamber. In this case, the spring brake actuator may further comprise a resilient biasing element by means of which the braking force is applied when the pressure in the spring brake chamber is below the predetermined level.

Figure 2:
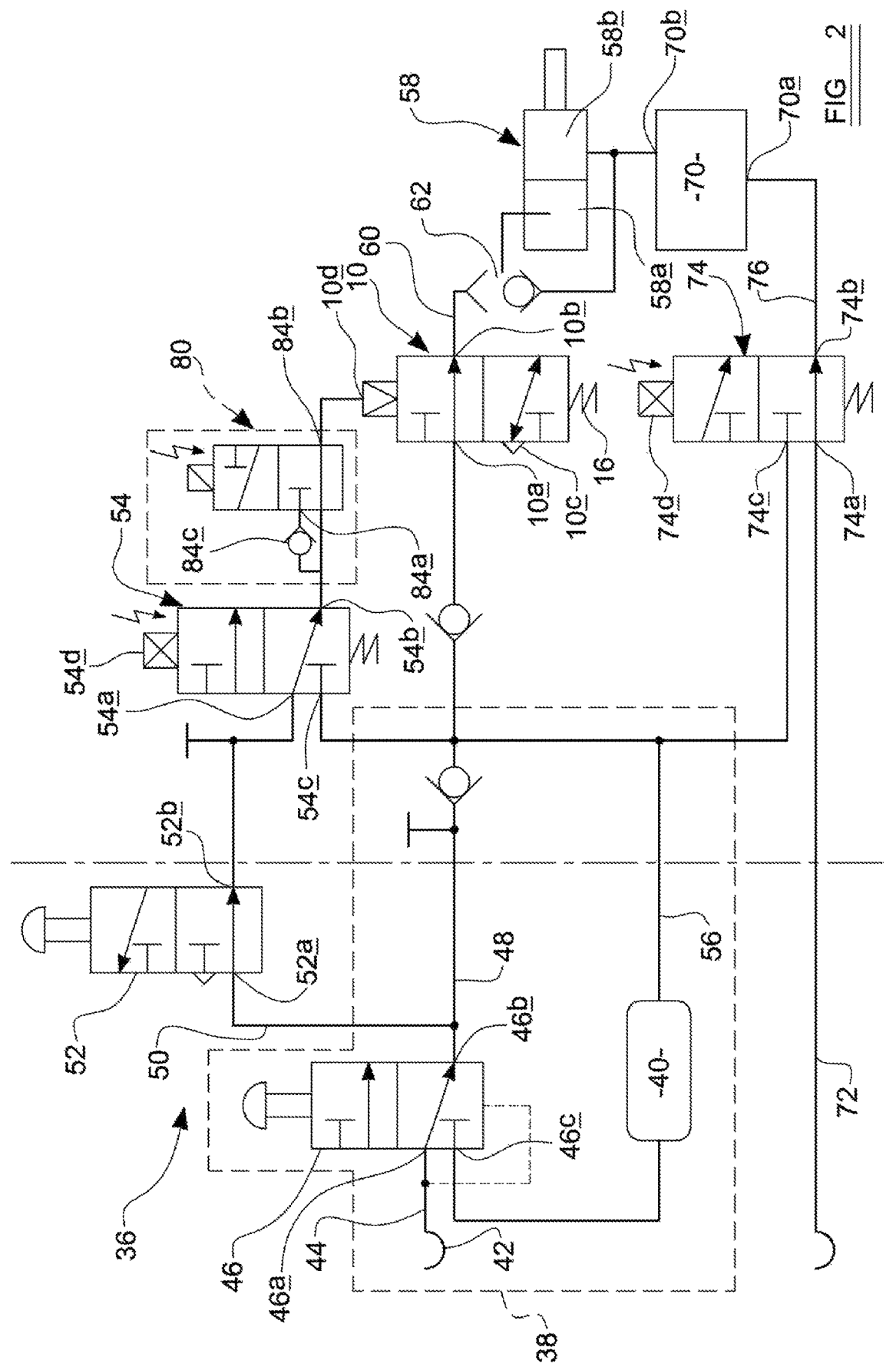
Figure 3:
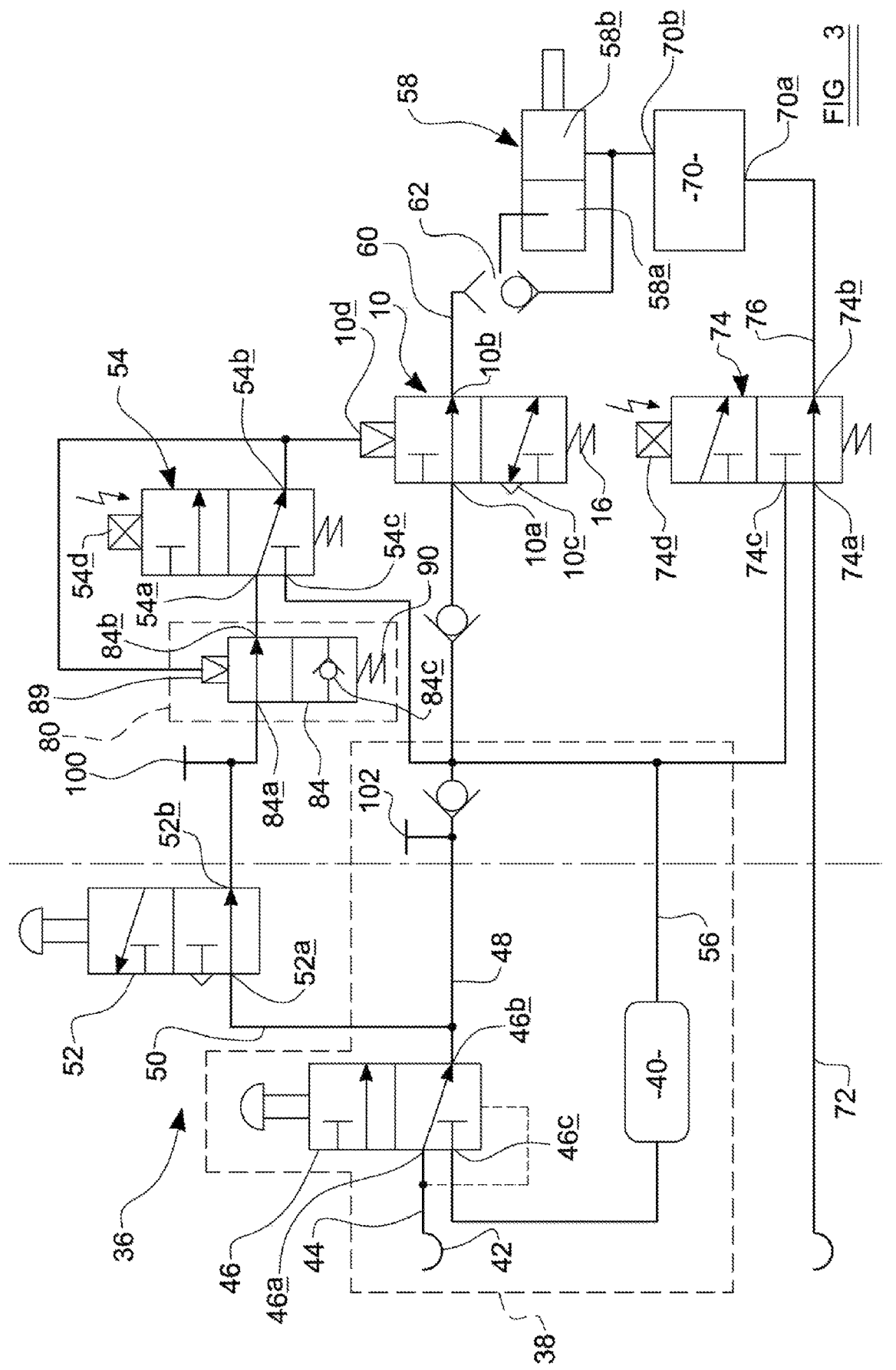
Figure 4:
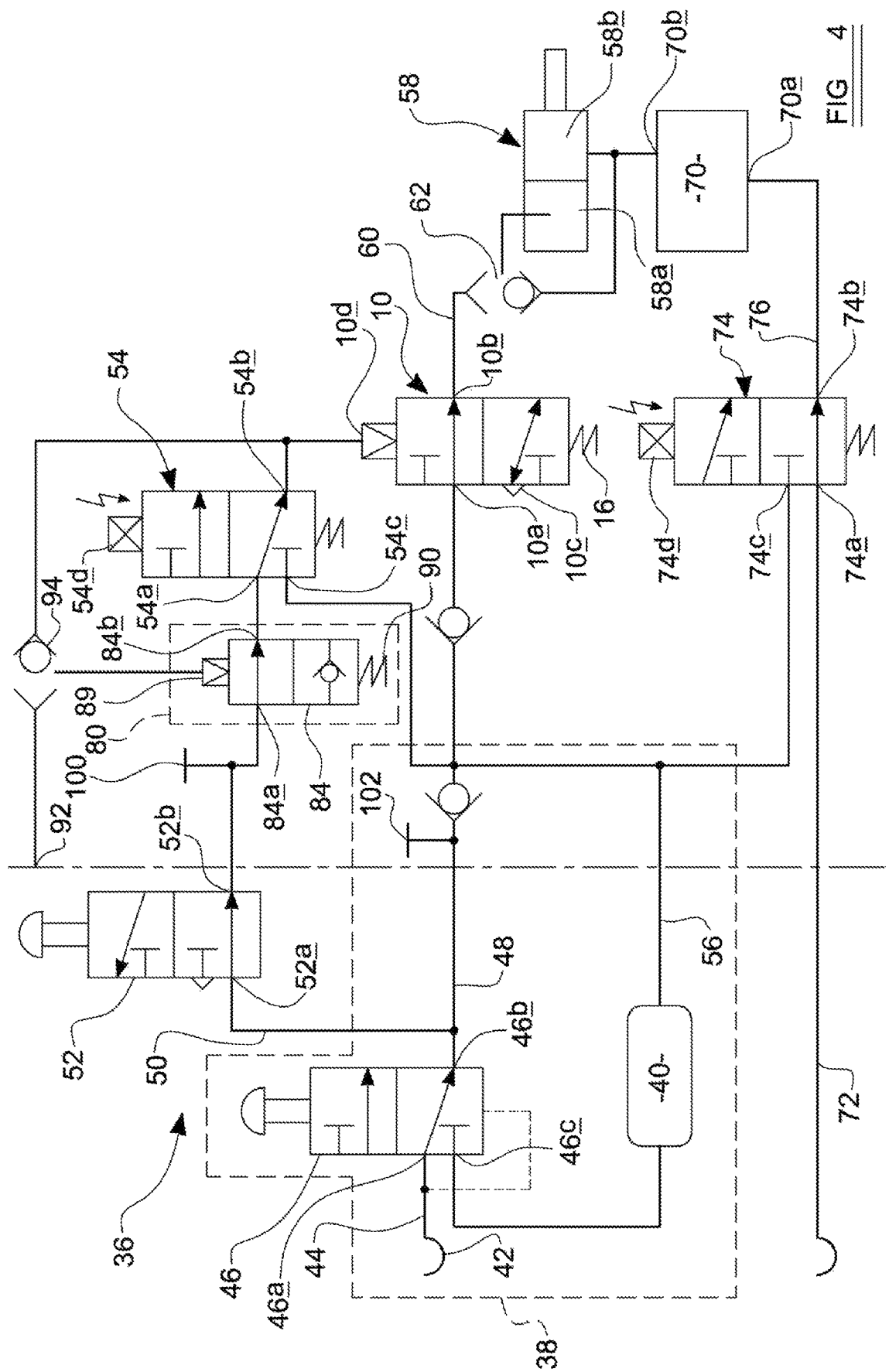
Figure 5:
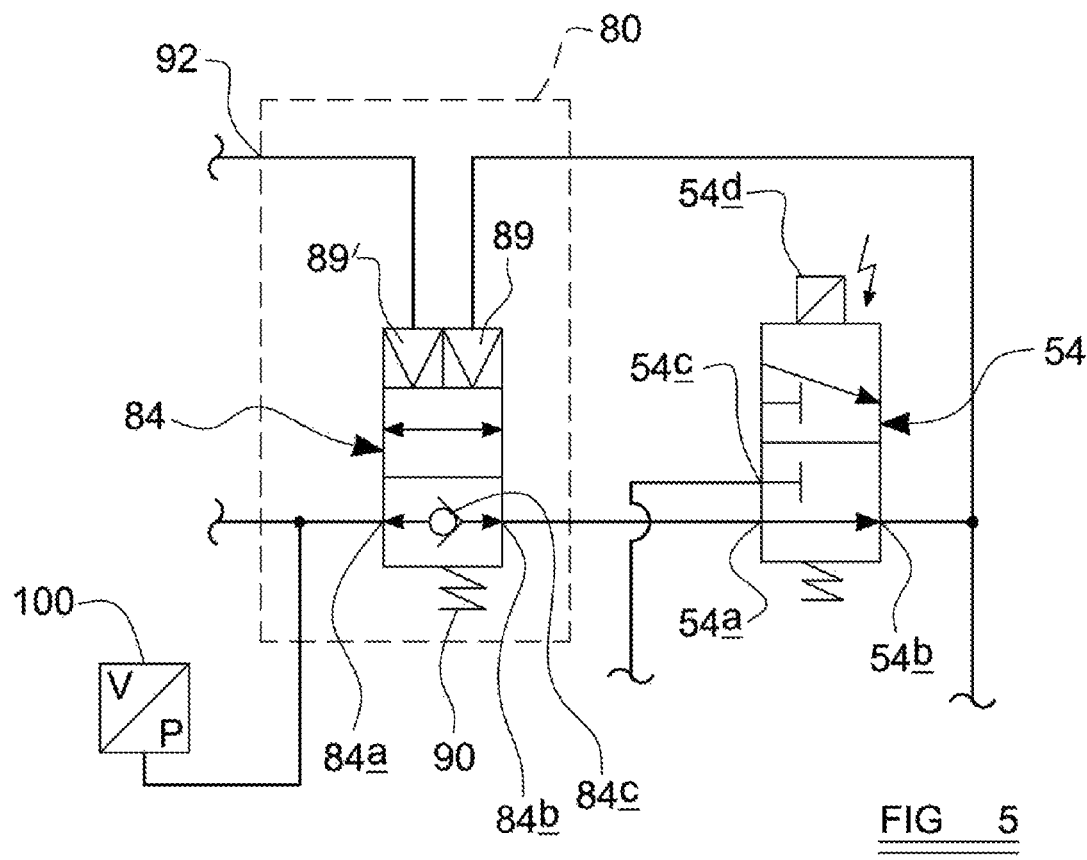
Figure 6:
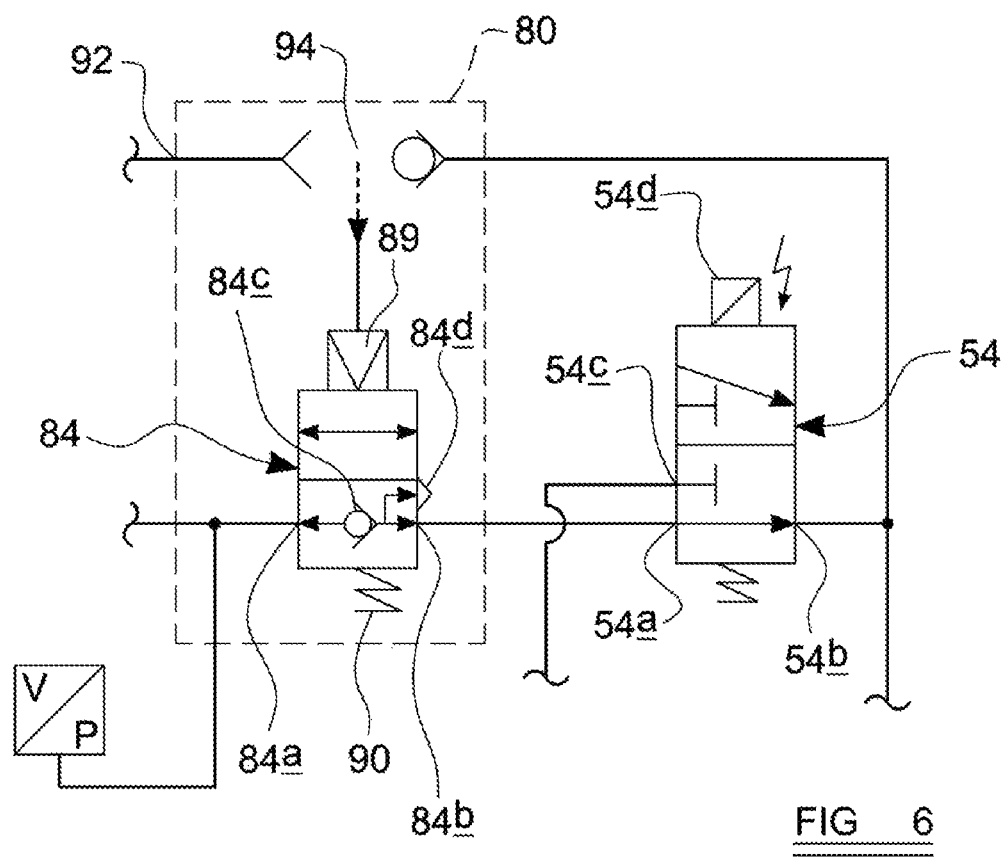

Embodiments of the invention will now be described, by way of example only, with reference to the following drawings, of which, FIG. 1 shows a schematic illustration of a first embodiment of vehicle braking system according to the invention, FIG. 2 shows a schematic illustration of a second embodiment of vehicle braking system according to the invention, FIG. 3 shows a schematic illustration of a third embodiment of vehicle braking system according to the invention, FIG. 4 shows a schematic illustration of a fourth embodiment of vehicle braking system according to the invention, FIG. 5 shows a schematic illustration of a portion of a fifth embodiment of vehicle braking system according to the invention, FIG. 6 shows a schematic illustration of a portion of a sixth embodiment of vehicle braking system according to the invention, and FIG. 7 shows a longitudinal cross-section through an immobiliser valve suitable for use in the fifth embodiment of the invention.

Referring now to FIGS. 1 to 4, there is shown a vehicle braking system 36, which is identical to the vehicle braking system 36 disclosed in WO 2012/175927 and GB2492124, except that the anti-compounding shuttle valve is illustrated, and that the system also includes an immobiliser valve assembly 80.

The figures show a braking system for a trailer vehicle comprising a spring brake actuator 58 having a spring brake chamber 58a, a spring brake control assembly and an immobiliser valve 84 which is movable between brake release position in which the spring brake control assembly can be operated to cause the flow of pressurised fluid into the spring brake chamber 58a or to vent the spring brake chamber 58a to a low pressure region, and an immobilise position in which the spring brake control assembly can be operated to connect the spring brake chamber 58a to a low pressure region but cannot be operated to cause the flow of pressurised fluid into the spring brake chamber.58a. In these embodiments of the invention, the spring brake control assembly comprises a spring brake control valve 10 and a park valve 52. In these embodiments, the braking system also includes a shunt valve 46 and an emergency braking override valve 54.

The spring brake control valve 10 has an inlet 10a which is adapted to be connected to a source of pressurised fluid 38, an outlet 10b which is connected to the spring brake chamber 58a via a spring brake line 60, and an exhaust port 10c which is connected to a low pressure region (typically the atmosphere). The spring brake control valve 10 is movable between a first position in its inlet 10a is connected to its outlet 10b whilst the exhaust port 10c is closed, and a second position in which its outlet 10b is connected to the exhaust port 10c whilst the inlet 10a is closed.

In these embodiments of the invention, the spring brake control valve 10 has a fluid pressure operated actuator with a control port 10d, the fluid pressure operated actuator being configured such that the supply of pressurised fluid to the control port 10d causes the spring brake control valve 10 to move to its first position. The spring brake control valve 10 also has a resilient biasing element 16 (a spring) which acts to urge the spring brake control valve 10 into its second position, and is configured such that when the fluid pressure at the control port 10d exceeds a pre-determined level, the spring brake control valve 10 moves against the biasing force of the resilient biasing element 10 from the second position to the first position.

Advantageously, the spring brake control valve 10 has a valve member which is movable between a first position in which the inlet 10a of the spring brake control valve 10 is connected to its outlet 10b whilst the valve member blocks the exhaust port 10c, and a second position in which the outlet 10b of the spring brake control valve 10 is connected to the exhaust port 10c whilst the valve member blocks the inlet 10a. In this case, the resilient basing element 16 acts on the valve member to urge it into its second position.

In this case, the source of pressurised fluid 38 to which the inlet 10a of the spring brake control valve 10 is connected comprises a pressurised fluid reservoir 40 and a connector 42 which is adapted to be connected to pressurised fluid supply from a tractor or truck pulling the trailer, via corresponding connector mounted on the tractor. The inlet 10a of the spring brake control valve 10 is connected to the connector 42 via a supply line 44 which extends from the connector 42 to a first inlet 46a of the shunt valve 46, an outlet 46b of the shunt valve 46 being connected to a junction between an emergency apply line 48 and a park line 50. The emergency apply line 48 extends to the inlet 10a of the spring brake control valve 10, whilst the park line 50 extends to the control port 10d of the spring brake control valve 10 via a manually operable park valve 52 and an electrically operable emergency braking override valve 54.

Two one-way check valves are provided in the emergency apply line 48, both being oriented to allow flow of fluid from the shunt valve 46 to the spring brake control valve 10 but to prevent flow of fluid in the other direction along the emergency apply line 48, i.e. away from the spring brake control valve 10.

A trailer reservoir supply line 56 extends from the emergency apply line 48 in between the two one-way check valves to a pressurised fluid reservoir 40 mounted on the trailer. An outlet from the trailer reservoir 40 is connected to a second inlet 46c of the shunt valve 46.

The shunt valve 46 is movable between a first position in which its first inlet 46a is connected to its outlet 46b whilst its second inlet 46c is closed, and a second position in which its first inlet 46a is closed and its second inlet 46c is connected to its outlet 46b. In this example, the shunt valve 46 is adapted to be moved manually between the first and second positions. It should be appreciated, however, that the provision of a shunt valve 46 is not essential, and the supply line 44 may be connected directly to the emergency apply line 48.

The park valve 52 is movable between a first position in which its inlet 52a is connected to its outlet 52b and a second position in which its inlet 52a is closed and its outlet 52b vents to a low pressure region (typically to atmosphere). In this example, the park valve 52 is adapted to be moved manually between the first and second positions.

The emergency braking override valve 54 has a first port 54a which is connected to the outlet 52b of the park valve 52, a second port 54b which is connected to the control port 10d of the spring brake control valve 10, and a third port 54c which is connected to the emergency apply line 48 between the two one-way check valves.

The emergency braking override valve 54 is movable between a first position in which its first port 54a is connected to its second port 54b, whilst its third port 54c is closed, and a second position in which its third port 54c is connected to its second port 54b whilst its first port 54a is closed. The emergency braking override valve 54 is electrically operable, in this example, by means of a solenoid 54d. Mechanical biasing means (in this example a spring) is provided to urge the emergency braking override valve 54 into the first position. Movement of the emergency braking override valve 54 from the first position to the second position is achieved by the supply of an electrical current to the solenoid 54d.

The supply of electrical power to the emergency braking override valve 54 is typically controlled by a trailer braking ECU, ie, a trailer EBS control unit.

As mentioned above, the vehicle braking system 36 comprises a conventional brake actuator 58 which has a spring brake chamber 58a and which is configured to apply a braking force to a wheel of the vehicle when the pressure in the spring brake chamber 58a falls below a predetermined level, and to release the/not apply a braking force to the wheel of the vehicle when the pressure in the spring brake chamber 58a is at or above the predetermined level. The outlet 10b of the spring brake control valve 10 is connected to the spring brake chamber 58a via a spring brake line 60, and an anti-compounding valve 62. The brake actuator 58 further comprises a resilient biasing element by means of which the braking force is applied when the pressure in the spring brake chamber 58a is below the predetermined level. Such spring brake actuators are well known to those skilled in the art.

The brake actuator 58 also has a service brake chamber 58b which is connected to the delivery outlet 70b of a conventional EBS control valve assembly 70. The brake actuator 58 is configured such that the supply of pressurised fluid to the service brake chamber causes a braking force to be applied to the wheels of the vehicle The EBS control valve assembly 70 typically comprises at least a modulator which has a control port 70a which is connected to a control line 72 for receipt of a fluid pressure braking demand signal, a supply port (not shown for clarity) which is connected to a source of pressurised fluid, the delivery port 70b which is connected to the service brake chamber 58b, and an exhaust port (not shown) which vents to a low pressure region.

The modulator 70 is operable to move between a build configuration in which the supply port is connected to the delivery port 70b whilst the exhaust port is closed, a hold configuration in which the exhaust port and the supply ports are closed and an exhaust configuration in which the delivery port 70b is connected to the exhaust port whilst the supply port is closed. Various configurations of modulator are well known to those skilled in the art. The EBS control valve assembly 70 is operable to provide anti-lock braking control.

The control line 72 is adapted to be coupled to a braking control line on a tractor to which the trailer is coupled, and carries a fluid pressure braking demand signal generated when a driver of the vehicle operates a brake pedal or the like to indicate a need for braking. The control line 72 is connected to a first inlet 74a of a brake apply valve 74, an outlet 74b of the brake apply valve 74 being connected the control inlet of the modulator 72 via a service brake line 76. A second inlet 74c of the brake apply valve 74 is connected to the trailer reservoir supply line 56.

The brake apply valve 74 is movable between a first position in which the first inlet 74a is connected to the outlet 74b, whilst the second inlet 74c is closed, and a second position in which the first inlet 74a is closed and the second inlet 74c is connected to the outlet 74b. The brake apply valve 74 is electrically operable, in this example, by means of a solenoid. Mechanical biasing means (in this example a spring) is provided to urge the brake apply valve 74 into the first position. Movement of the brake apply valve 74 from the first position to the second position is achieved by the supply of an electrical current to the solenoid 74d.

The outlet 70b of the modulator 70 is also connected to the anti-compounding valve 62. This is a two-way check valve which acts to connect whichever of the outlet of the spring brake control valve 10 or the outlet 70b of the modulator 70 is carrying the highest pressure to the spring brake chamber 58a. Such anti-compounding valves are well-known to persons skilled in the art, and prevent the brakes being damaged by the simultaneous application of a braking force from the spring brake and service brake.

Full details of all the parts of this braking system 36, and its operation are described more fully in WO2012/175927 and GB2492124, the entire contents of which are incorporated by reference herein. As mentioned above, the braking system illustrated in the accompanying Figures differs from that described in WO2012/175927 and GB2492124 in that it also includes an immobiliser assembly 80.

The immobiliser assembly 80 includes an immobiliser valve 84 which is movable between brake release position in which the spring brake control assembly can be operated to cause the flow of pressurised fluid into the spring brake chamber 58a or to vent the spring brake chamber 58a to a low pressure region, and an immobilise position in which the spring brake control assembly can be operated to connect the spring brake chamber 58a to a low pressure region but cannot be operated to cause the flow of pressurised fluid into the spring brake chamber 58a.

The immobiliser valve 84 has an inlet 84a and an outlet 84b and a check valve 84c, and is configured such that when the immobiliser valve 84 is in its brake release position the inlet 84a is connected to the outlet 84b so that flow of fluid from the inlet 84a to the outlet 84b and vice versa is permitted, and when the immobiliser valve 84 is in its immobilise position, its inlet 84a is connected to the outlet 84b via the check valve 84c such that flow of fluid from outlet 84b to the inlet 84a is permitted but the check valve 84c acts to prevent flow of fluid from the inlet 84a to the outlet 84b.

In the embodiments of the invention illustrated in FIGS. 1 and 2, the immobiliser valve 84 is an electrically operated bi-stable valve, and is configured such that when in its brake release position, on receipt of an electrical signal, it moves to its immobilise position, and remains in the immobilise position once the electrical signal ceases, and when in its immobilise position, on receipt of electrical signal, it moves to the brake release position and remains in the brake release position once the electrical signal ceases.

As illustrated in FIG. 1, the immobiliser valve assembly 80 may, for example, be provided with a fluid pressure operated actuator which, when supplied with pressurised fluid when in its brake release position, moves the immobiliser valve 84 to its immobilise position, and when supplied with pressurised fluid when in its immobilise position, moves the immobiliser valve to its brake release position. In this case, the immobiliser assembly 80 further includes an electrically operated immobiliser control valve 86, such as a solenoid operated valve, by means of which the fluid pressure operated actuator is connected to a pressurised fluid reservoir 88. The pressurised fluid reservoir 88 may, of course, be the trailer reservoir 40 described above. The immobiliser control valve 86 is configured, when energised, to move to allow flow of fluid from the reservoir 88 to the fluid pressure operated actuator, and to return to a rest position in which the fluid pressure operated actuator is connected to a low pressure region (typically the atmosphere) when not energised.

Alternatively, the immobiliser valve 84 need not include a fluid pressure operated actuator, and may simply comprise a solenoid operated bi-stable valve, as illustrated in FIG. 2.

As a further alternative, the immobiliser valve may comprise a magnetically-latching solenoid of the sort described in U.S. Pat. No. 6,392,516, for example. In this case, the solenoid may act directly on a valve member of the check valve, holding the valve member in an open position when the immobiliser valve 84 is in the brake release position, and releasing the valve member so that it operates as a one-way check valve, i.e. to permit flow of fluid through the immobiliser valve 84 in one direction only.

Alternatively, the immobiliser valve 84 may be configured to move automatically from the brake release position to the immobilise position when the spring brake chamber 58a is connected to a low pressure region. Embodiments of immobiliser valve 84 which are configured in this way are illustrated in FIGS. 3 and 4. In these case, the immobiliser valve 84 includes a fluid pressure operated actuator 89 and a resilient biasing element 90 which urges the immobiliser valve 84 to its immobilise position, the fluid pressure operated actuator 89 being configured such that the supply of pressurised fluid to the actuator 89 moves the immobiliser valve 84 against the force of the resilient biasing element 90 into its brake release position.

In these embodiments, the fluid pressure operated actuator 89 of the immobiliser valve 84 is connected to the control port 10d of the spring brake control valve 10 between the outlet 54b of the emergency braking override valve 54 and the control port 10d. This means that when the control port 10d of the spring brake control valve 10 is pressurised, the immobiliser valve 84 moves to the brake release position.

In the embodiment of the invention illustrated in FIG. 4, the fluid pressure operated actuator 89 of the immobiliser valve 84 is connected to the outlet of a two-way check valve 94 having a first inlet which is connected to the control port 10d of the spring brake control valve 10 and a second inlet which is connectable to an alternative source of pressurised fluid via a port 92. The two-way check valve 94 is configured to connect the first inlet to the outlet if the pressure at the first inlet is greater than the pressure at the second inlet, and to connect the second inlet to the outlet if the pressure at the second inlet is greater than the pressure at the first inlet.

A further alternative embodiment of immobiliser valve 84 is illustrated in FIG. 5. This provides the same functionality as the configuration illustrated in FIG. 4, but without the two way check valve 94. In this case, the immobiliser valve 84 is provided with two fluid pressure operated actuators 89,89'. The first fluid pressure operated actuator 89 is connected to the control port 10d of the spring brake control valve 10 between the outlet 54b of the emergency braking override valve 54 and the control port 10 and operates in exactly the same way as the fluid pressure operated actuator 89 of the embodiment of immobiliser valve 84 illustrated in FIG. 3. In other words, it pushes the immobiliser valve 84 against the biasing force of the spring 90 into its brake release position.

The second fluid pressure operated actuator 89' is connected to an alternative source of pressurised fluid via port 92 in the same way as is the second inlet of the two-way check valve 94 in the FIG. 4 embodiment. The second fluid pressure operated actuator 89' is configured to move the immobiliser valve 84 against the biasing force of the spring 90 into its brake release position when the pressure of fluid from the alternative source of pressurised fluid exceeds a pre-determined amount. The immobiliser valve 84 may be located in the spring brake line 60, and arranged such that when it is in its immobilise position, the immobiliser valve 84 permits flow of fluid from spring brake chamber 58*a* to the outlet 10*b* of the spring brake control valve 10 whilst substantially preventing flow of fluid from the outlet spring brake control valve 10 into the spring brake chamber 58*a*. In the preferred embodiments of the invention illustrated in the figures, however, the immobiliser valve is located in the park line 50 which extends from the source of pressurised fluid 38 to the control port 10*d* of the spring brake control valve 10, the immobiliser valve 84, when in its brake release position allowing flow of fluid in a first direction along the park line 50 away from the control port 10*d*, and along the park line 50 in a second direction towards the control port 10*d*, and when in its immobilised position allowing the flow of fluid in the first direction along the park line 50 but substantially preventing the flow of fluid in the second direction along the park line 50.

In the embodiments of the invention illustrated in FIGS. 1 and 2, the immobiliser valve 84 is located in the park line 50 between the outlet 54*b* of the emergency braking override valve 54 and the control port 10*d* of the spring brake control valve 10.

In the embodiments of the invention illustrated in FIGS. 3, 4 and 5, the emergency braking override valve 54 is located in the park line 50 between the immobiliser valve 84 and the control port 10*d* of the spring brake control valve 10. In this case, the immobiliser valve 84 is located in the park line 50 between the outlet 52*b* of the park valve and the inlet 54*a* of the emergency braking override valve 54.

It should be appreciated that whilst in the preferred embodiments of the invention illustrated in attached Figures, where the immobiliser valve 84 is an electrically operated bi-stable valve, it is located in the park line 50 between the outlet 54*b* of the emergency braking override valve 54 and the control port 10*d*, this configuration of electrically operated bi-stable immobiliser valve could equally be located in the position of the immobiliser valve 84 illustrated in FIGS. 3,4, and 5 i.e. between the outlet 52*b* of the park valve 52 and the inlet 54*a* of the emergency braking override valve 54. Similarly, the piloted immobiliser valve 84 illustrated in FIGS. 3, 4, and 5 could equally be located in the position of the immobiliser valve 84 illustrated in FIGS. 1 and 2, i.e. in the park line 50 between the outlet 54*b* of the emergency braking override valve 54 and the control port 10*d*.

Use of an immobiliser valve is not restricted to this particular configuration of trailer braking system, however, and could be used in any braking system that acts to deliver pressurised fluid to the spring brakes or to vent them to atmosphere. If the braking system does not include a pilot operated spring brake control valve having a park line in which the immobilizer valve could be located (as shown in the FIG. 1), the immobiliser valve could be located in the line to the spring brake chamber as discussed on pages 14 and 15 above.

The vehicle braking system 36 according to invention operates as follows. Under normal driving conditions, the connector 42 is pressurised by virtue of its connection to "the red line". i.e. the tractor based supply of pressurised fluid, and the shunt valve 46, park valve 52 and emergency braking override valve 54 are all in their first positions, as illustrated in the figures, and the immobiliser valve 84 is in its brake release position. As a result, the control port 10*d* is connected to the connector 42 and is therefore pressurised, and, the spring brake control valve 10 is also in its first position. Pressurised fluid can therefore flow from the source of pressurised fluid 38, along the emergency apply line 48, and into the spring brake chamber 58*a* to release the spring brakes.

When the vehicle is parked, the spring brakes can be applied by the release of pressurised fluid from the control port 10*d* of the spring brake control valve 10. This can be achieved by manual movement of the park valve 52 from its first position to its second position. It could alternatively be achieved by disconnecting the trailer from the tractor so that the connector 42 is disconnected from the external source of pressurised fluid and the supply line 44 thus exhausted to atmosphere. In the absence of pressurised fluid at the control port 10*d* of the spring brake control valve 10, the spring 16 pushes the spring brake control valve 10 into its second position. As a result, the inlet 10*a* is closed, and the outlet 10*b* is connected to the exhaust port 10*c*. The spring brake chamber 58*a* is thus vented to atmosphere via the exhaust port 10*c*, and the spring brake applied.

If it is desired to immobilise the trailer, i.e. to prevent the subsequent release of the spring brake in the embodiments of the invention illustrated in FIGS. 1 and 2, electrical power is supplied to the immobliser valve assembly 80 to move it from the brake release position to the immobilise position. The immobiliser valve 84 therefore acts as a check valve preventing the flow of fluid along the park line 50 to the control port 10*b* of the spring brake control valve 10. The immobiliser valve 84 will, however, allow flow of pressurised fluid along the park line 50 away from the control port 10*d*. This means that the immobiliser valve 84 can be activated, i.e. moved to its immobilise position, prior to the application of the spring brakes. This is particularly advantageous because, if the spring brakes have been applied by virtue of the uncoupling of the trailer from its tractor, the uncoupling process generally involves disconnecting the trailer from its source of electrical power. As such, if the trailer is uncoupled first, there may not be any electrical power to activate the immobiliser valve 84.

In this case, when the trailer is uncoupled to release the pressure at the connector 42, or the spring brake applied manually by moving the park valve 52 from its first position to its second position, the check valve 84*c* in the immobiliser valve 84 allows the fluid pressure to be released from the control port 10*d* of the spring brake control valve 10, so that the spring brake control valve 10 moves to its second position to exhaust the spring brake chamber 58*a*.

If the trailer is then coupled to a tractor, and the connector 42 pressurised, and/or the park valve 52 returned to its first position, the immobiliser valve 84 prevents the flow of pressurised fluid along the park line 50 to the control port 10*d* of the spring brake control valve 10. The spring brake control valve 10 is therefore locked in its second position by the immobiliser valve 84.

The locking of the brakes could be initiated in response to an input from the driver of the vehicle, for example by typing a pin into a keypad mounted on the trailer or in the cab of the tractor, by wireless transmission of a locking signal from a mobile telecommunications device such as a mobile phone, or by carrying out a specific locking sequence using the ignition key and service brake pedal.

Locking of the spring brakes may assist in preventing the theft or unauthorised movement of a parked trailer, as the spring brakes can no longer be released simply by connecting the connector 42 to a supply of pressurised fluid.

To unlock the brakes, the connector 42 must be connected to a supply of pressurised fluid, the park valve 52 in its first position, and the braking system 36 connected to a source of electrical power. In response to the input of an unlock signal from a user, for example, via the entry of a pin into a key, the generation of an unlock signal from a mobile telecommunications device such as a mobile phone, or the carrying out of a specific unlocking sequence using the ignition and service brake pedal, the immobiliser valve assembly is energised. The supply of electrical power to the immobiliser valve assembly 80 returns it to its brake release position. Pressurised fluid can then flow to the control port 10*d* of the spring brake control valve 10 to move the spring brake control valve 10 to its first position so that there is supply of pressurised fluid to the spring brake chamber 58*a*, and the spring brake is released.

In the embodiments of the invention illustrated in FIGS. 3 and 4, the release of pressurised fluid from the control port 10*d* causes a loss of pressure in the actuator 89 of the immobiliser valve 84, and so the immobiliser valve 84 moves under the action of its resilient biasing element 90 to the immobilise position. In other words, movement of the immobilise valve 84 to the immobilise position is automatic as soon as the spring brake is applied, no electrical power is required to achieve this. As with the embodiment of the invention illustrated in FIGS. 1 and 2, once in the immobilise position, the immobiliser valve 84 acts as a check valve preventing the flow of fluid along the park line 50 to the control port 10*b* of the spring brake control valve 10. If the trailer is then coupled to a tractor, and the connector 42 pressurised, and/or the park valve 52 returned to its first position, the immobiliser valve 84 prevents the flow of pressurised fluid along the park line 50 to the control port 10*d* of the spring brake control valve 10. The spring brake control valve 10 is again locked in its second position by the immobiliser valve 84.

In this case, the spring brakes can be released by the supply of electrical power to the solenoid operated actuator 54*d* of the emergency braking override valve 54. This causes the emergency braking override valve 54 to move to its second position in which the trailer reservoir 40 is connected to the control port 10*d* of the spring brake control valve 10, which therefore moves back to its first position whereby the spring brake chamber 58*a* is pressurised. The actuator 89 of the immobiliser valve 84 is also connected to the trailer reservoir 40, and so the immobiliser valve 84 moves back to its brake release position. If the park valve 52 is in its first position, and the connector 42 pressurised, the emergency braking override valve 54 can then be deenergised, so that it returns to its first position. Pressurised fluid from the connector 42 passes along the park line 50 to maintain the spring brake control valve 10 in its first position, and the immobiliser valve 84 in its brake release position.

Again, the emergency brake apply valve 54 can be energised in response to the input of an unlock signal from a user, for example, via the entry of a pin into a key, the generation of an unlock signal from a mobile telecommunications device such as a mobile phone, or the carrying out of a specific unlocking sequence using the ignition and service brake pedal.

It will be appreciated that the spring brakes can be released by the supply of electrical power to the emergency braking override valve 54 even if the trailer is not coupled to a tractor, (and therefore the connector 42 is unpressurised), providing there is sufficient pressure in the trailer reservoir 40 to overcome the biasing force of the spring in the spring brake actuator 58. In this case, however, deenergising the emergency braking override valve 54 will cause the spring brake control valve 10 to return to its second position to apply the spring brake, and the immobiliser valve 84 to return to its immobilise position.

The emergency braking override valve 54 can also be used as described in WO2012/175927 and GB2492124 to override the emergency application of the spring brakes in the event of a loss of red line pressure, ie. pressure at connector 42, during vehicle travel. The ECU which controls the supply of electrical power to the emergency braking override valve 54 can be programmed such that the emergency braking override valve 54 can be energised to override the emergency application of the spring brakes if there is direct determination of the loss of red line pressure (for example using either of the pressure transducers 100, 102), if there is the required electrical connection to warn the driver of the loss of red line pressure, and if the pressure in the trailer reservoir 40 is monitored and the overriding ceased if the vehicle comes to a rest or the reservoir drops to 4.5 bar.

The provision of the double check valve 94 in the embodiment of the invention illustrated in FIG. 4, or the double fluid pressure operated actuators 89,89' in the embodiment of immobiliser valve 84 illustrated in FIG. 5, also provides for the pneumatic release of the spring brake. If the port 92 is pressurised, for example, by connection to an external source of pressurised fluid, to the trailer reservoir 40 or to a service braking pressure, the fluid pressure at port 92 will move the immobiliser valve 84 to its brake release position. Thus, if the connector 42 is pressurised, or the shunt valve 46 moved to its second position, there will be flow of pressurised fluid along the park line 50 to the control port 10*d* of the spring brake control valve 10. The spring brake control valve 10 can then return to its first position, whereby the spring brake chamber 58*a* is pressurised.

A further alternative embodiment of immobiliser valve 84 is illustrated schematically in FIG. 6. In this case, a small hole is provided in the valve housing to provide a leak path between the spring brake control valve 10 side of the check valve 84*c* and the atmosphere. It is shown in the immobliser valve shown in FIG. 4, but could equally be applied to the valve shown in FIG. 3 or 5.

This can be useful in the arrangements illustrated in FIGS. 3 and 4 in which the immobiliser valve is located in the park line 50 between the outlet 52*b* of the park valve and the inlet 54*a* of the emergency braking override valve 54. This useful because, when the immobiliser valve 84 is in its immobilise position and the emergency braking override valve 54 is in its first position (as illustrated in FIG. 6), but the connector 42 is pressurised and the park valve 52 in its first position (as described in lines 20-24 on page 18 above), leakage from the third port 54*c* of the emergency braking override valve 54 (which is connected to the trailer reservoir 40 via the trailer reservoir supply line 56) to the first port 54*a* could cause the fluid pressure at the control port 10*d* of the spring brake control valve 10 side of the check valve 84*c* to build up sufficiently to move the spring brake control valve 10 to its first position, thus releasing the spring brakes prematurely. The leak path from the spring brake control valve 10 side of the check valve 84*c* to the atmosphere ensures that the pressure at the control port 10*d* of the spring brake control valve 10 cannot build up in this way.

FIG. 7 shows an example of how this could be implemented in an immobiliser valve of the type illustrated in FIG. 5. In this, the first port 84*a*, which, when used as illustrated in FIG. 3 or 4, is connected to the second port 52*b* of the park valve 52 is shown at the top of the figure, and second port 84*b*, which, when used as illustrated in FIG. 3 or 4, is connected to the first port 54*a* of the emergency override valve 54, is shown at the bottom of the figure. The check valve 84c is located towards the lefthand side, whilst the connection to the alternative source of pressurised fluid via port 92 extends from the righthand side of the valve 84.

The immobiliser valve 84 has a housing 108, and the two fluid pressure operated actuators 89,89' comprise first and second pistons respectively which are mounted in a cylinder provided by the housing. The first piston 89 is located between the check valve 84c and the second piston 89, and when moved in a first direction (to the left in FIG. 7) pushes the check valve 84c away from its valve seat with the result that there is free flow of fluid from the first port 84a and the second port 84b of the immobiliser valve 84. The immobiliser valve 84 is thus in its brake release position. Spring 90 extends between the housing 108 and the check valve 84c, and urges the check valve 84c into engagement with its valve seat. A further spring 110 is located between the housing 108 and the first piston 89 and urges the first piston 89 in a second, opposite direction, away from the check valve 84c. The connection to the control port 10d of the spring brake control valve 10 is provided by means of an aperture (not shown) in the housing 108 which extends into the space in the cylinder between the two pistons 89, 89'.

If the pressure supplied through this aperture is sufficient to overcome the biasing force of spring 110, it will push the first piston 89 in the first direction, which will, in turn, push the check valve 84c away from its valve seat, so that the immobiliser valve 84 moves to its brake release position. Otherwise, the spring 110 pushes the piston 89 in the second direction away from the check valve 84c, so the check valve 84c is moved by spring 90 into engagement with its valve seat, whereupon flow from the second port 84b to the first port 84a is permitted but flow in the opposite direction is prevented.

The second piston 89' is configured such that fluid pressure from port 92 pushes it towards the first piston 89, and if this pressure is sufficient to overcome the biasing force of spring 110, it will push the first piston 89 in the first direction, which will, in turn, push the check valve 84c away from its valve seat, so that the immobiliser valve 84 moves to its brake release position.

The leak path discussed above is provided by means of a small aperture through the housing 108 into the space between the first piston 89 and the check valve seat.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle braking system, comprising:
a spring brake actuator having a spring brake chamber for controlling application of a spring brake;
a spring brake control assembly; and
an immobiliser valve which is movable between a brake release position and an immobilise position,
the brake release position configuring the spring brake control assembly so that it is operable to move between a first state in which flow of pressurised fluid is permitted into the spring brake chamber and a second state in which the spring brake chamber is vented, and
the immobilise position configuring the spring brake control assembly so that it is operable to move to the second state and to prevent the first state such that the immobiliser valve is activated to its immobilise position prior to, and independently from, application of the spring brake.

2. The vehicle braking system according to claim 1 wherein the immobiliser valve has an inlet, an outlet, and a check valve and is configured such that when the immobiliser valve is in its brake release position, the inlet is connected directly to the outlet so that flow of fluid between the inlet and the outlet is permitted, and when the immobiliser valve is in the immobilise position, the inlet is connected to the outlet via the check valve such that flow of fluid from the outlet to the inlet is permitted and the flow of fluid from the inlet to the outlet is prevented.

3. The vehicle braking system according to claim 1, wherein the spring brake control assembly includes a spring brake control valve having an inlet for pressurised fluid, an outlet which is connected to the spring brake chamber via a spring brake line, and an exhaust port which is connected to a low pressure region, the spring brake control valve being movable between a first position, in which the inlet of the spring brake control valve is connected to the outlet whilst the exhaust port is closed, and a second position, in which the outlet of the spring brake control valve is connected to the exhaust port whilst the inlet is closed.

4. The vehicle braking system according to claim 3 wherein the immobiliser valve is located in the spring brake line and arranged such that when the immobiliser valve is in the immobilise position, the immobiliser valve permits flow of fluid from the spring brake chamber to the outlet of the spring brake control valve whilst substantially preventing flow of fluid from the outlet of the spring brake control valve into the spring brake chamber.

5. The vehicle braking system according to claim 3, wherein the spring brake control valve has at least one of a supply of pressurised fluid to a control port causing the spring brake control valve to move to its first position or a resilient biasing element which acts to urge the spring brake control valve into the second position.

6. The vehicle braking system according to claim 5 wherein the spring brake control valve is configured such that when the fluid pressure at the control port exceeds a pre-determined level, the spring brake control valve moves against the biasing force of the resilient biasing element from the second position to the first position.

7. The vehicle braking system according to claim 6 wherein an electrically operable emergency braking override valve is located in a park line and has a first inlet which is connected to a portion of the park line facilitating the supply of pressurised fluid, a second inlet which is connected to a pressurised fluid reservoir, and an outlet which is connected to a portion of the park line which extends towards the control port of the spring brake control valve, the emergency braking override valve being movable between a first position, in which its first inlet is connected to the outlet, and a second position in which the second inlet is connected to the outlet.

8. The vehicle braking system according to claim 7 wherein the immobiliser valve is located in the park line between the outlet of the emergency braking override valve and the control port of the spring brake control valve.

9. The vehicle braking system according to claim 7 wherein the emergency braking override valve is located in the park line between the immobiliser valve and the control port of the spring brake control valve.

10. The vehicle braking system according to claim 5, wherein the immobiliser valve is located in a park line facilitating the supply of pressurised fluid to the control port of the spring brake control valve, the immobiliser valve, when in its brake release position, allowing flow of fluid in a first direction along the park line away from the control port and along the park line in a second direction towards the control port, and when in the immobilise position allowing the flow of fluid in the first direction along the park line and substantially preventing the flow of fluid in the second direction along the park line.

11. The vehicle braking system according to claim 10, wherein an electrically operable emergency braking override valve is located in the park line and has a first inlet which is connected to a portion of the park line facilitating the supply of pressurised fluid, a second inlet which is connected to a pressurised fluid reservoir, and an outlet which is connected to a portion of the park line which extends towards the control port of the spring brake control valve, the electrically operable emergency braking override valve being movable between a first position, in which its first inlet is connected to the outlet, and a second position, in which the second inlet is connected to the outlet.

12. The vehicle braking system according to claim 11, wherein the immobiliser valve is located in the park line between the outlet of the electrically operable emergency braking override valve and the control port of the spring brake control valve.

13. The vehicle braking system according to claim 11, wherein the electrically operable emergency braking override valve is located in the park line between the immobiliser valve and the control port of the spring brake control valve.

14. The vehicle braking system according to claim 10, wherein a park valve is located in the park line and is movable between a first position, in which the park valve does not impede flow of fluid along the park line, and a second position, in which the park valve vents the portion of the park line extending towards the control port of the spring brake control valve.

15. The vehicle braking system according to claim 14, wherein an emergency braking override valve is located in the park line between the control port of the spring brake control valve and the park valve.

16. The vehicle braking system according to claim 14, wherein the immobiliser valve is located in the park line between the park valve and the emergency braking override valve.

17. The vehicle braking system according to claim 10, wherein the spring brake control valve comprises a control port connected to a connector via the park line.

18. The vehicle braking system according to claim 1, wherein the vehicle braking system further includes an electrically operable emergency braking override valve which is electrically operable to cause the flow of pressurised fluid to the spring brake chamber even when the immobiliser is in the immobilise position.

19. The vehicle braking system according to claim 1, wherein the immobiliser valve is an electrically operated bi-stable valve, which, when in the brake release position and on receipt of a first electrical signal, moves to the immobilise position, and remains in the immobilise position once the first electrical signal ceases, and when in the immobilise position, on receipt of a second electrical signal, moves to the brake release position and remains in the brake release position once the second electrical signal ceases.

20. The vehicle braking system according to claim 1, wherein the spring brake control assembly further includes a park valve which is manually movable to a position which causes the spring brake control assembly to vent the spring brake chamber.

21. The vehicle braking system according to claim 20 wherein wherein the spring brake control assembly includes a spring brake control valve having a control port, and wherein the park valve is located in a park line and is movable between a first position, in which the park valve does not impede flow of fluid along the park line, and a second position, in which the park valve vents a portion of the park line extending towards the control port of the spring brake control valve.

22. The vehicle braking system according to claim 21 wherein an emergency braking override valve is located in the park line between the control port of the spring brake control valve and the park valve.

23. The vehicle braking system according to claim 21 wherein the immobiliser valve is located in the park line between the park valve and an emergency braking override valve.

24. The vehicle braking system according to claim 1 further comprising a source of pressurised fluid, wherein the spring brake control valve comprises an inlet connected to the source of pressurised fluid.

25. The vehicle braking system according to claim 24 wherein the source of pressurised fluid comprises a pressurised fluid reservoir.

26. The vehicle braking system according to claim 24 wherein the source of pressurised fluid comprises a connector which is adapted to be connected to an external source of pressurised fluid.

27. The vehicle braking system according to claim 26 wherein the vehicle braking system is a trailer braking system and the source of pressurised fluid comprises the connector which is adapted, in use, to be connected to a pressurised fluid supply mounted on a tractor.

28. The vehicle braking system according to claim 27 wherein, the spring brake control valve comprises a control port, connected to the connector via a park line.

29. The vehicle braking system according to claim 1, wherein the spring brake actuator is configured to apply a braking force to a wheel of the vehicle when the pressure in the spring brake chamber falls below a predetermined level, and to release or not apply the braking force to the wheel of the vehicle when the pressure in the spring brake chamber is at or above the predetermined level.

30. The vehicle braking system according to claim 29 wherein the spring brake actuator further comprises a resilient biasing element by means of which the braking force is applied when the pressure in the spring brake chamber is below the predetermined level.

* * * * *